July 1, 1930.     R. H. KIPP     1,769,142
CULTIVATOR
Filed July 9, 1928     2 Sheets-Sheet 1

Inventor
Roy H. Kipp
By H. P. Daulitt
Atty.

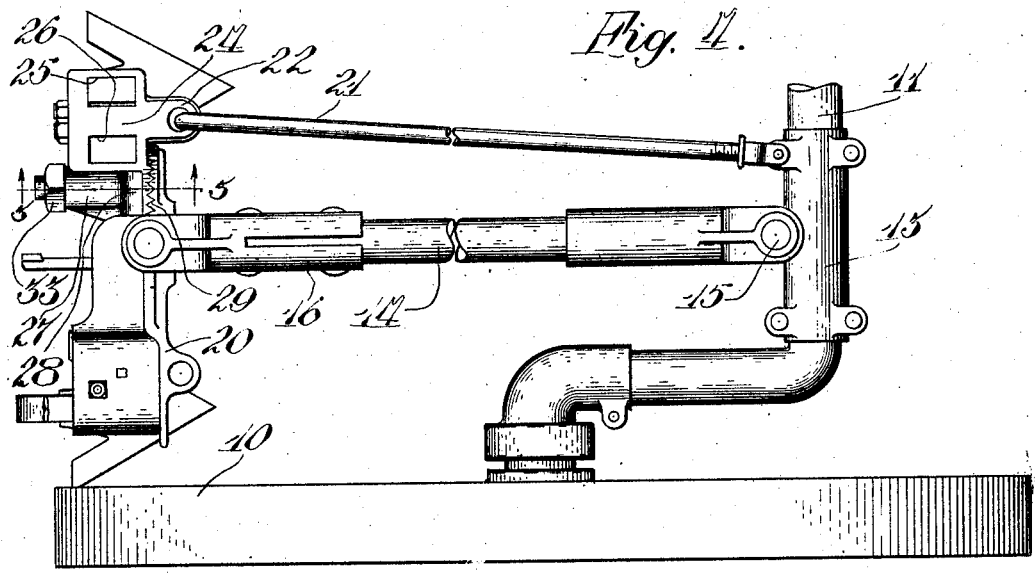
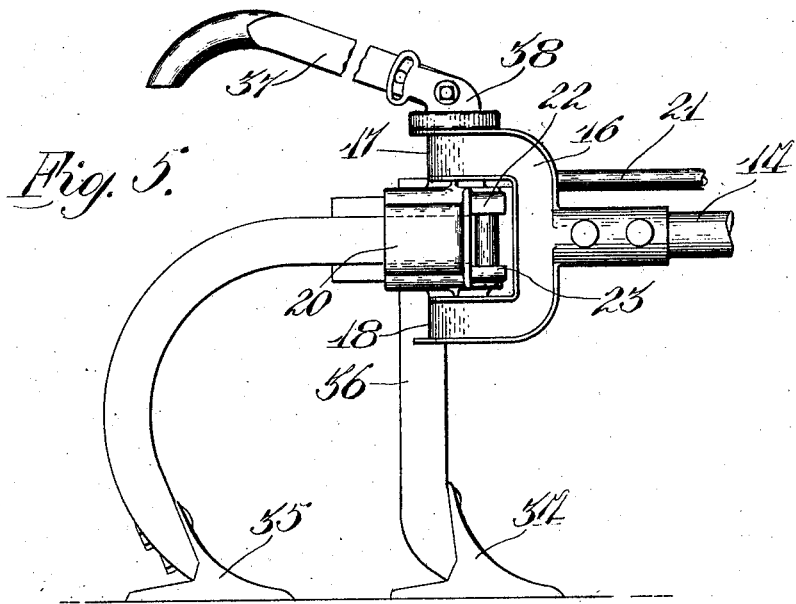

Patented July 1, 1930

1,769,142

UNITED STATES PATENT OFFICE

ROY H. KIPP, OF CANTON, ILLINOIS, ASSIGNOR TO INTERNATIONAL HARVESTER COMPANY, A CORPORATION OF NEW JERSEY

CULTIVATOR

Application filed July 9, 1928. Serial No. 291,257.

The invention here presented pertains to cultivators and more particularly to an improvement in mechanism for adapting cultivator shovels to different uses.

An object of the invention is to provide cultivator beams capable of holding the attached cultivator shovels at different relative positions for different kinds of work.

A further object of the invention is to provide a cultivator cross beam permitting the inner cultivator shovels to be simultaneously angled and elevated relative to the outer shovels by a single adjustment of said beam, the outer shovels being at the same time held in normal operating position.

The invention is illustrated in the accompanying drawings, in which:

Figure 4 is a plan of one-half of the cultivator showing the improved cross beam construction; and Figure 5 is a side elevation of the rear end of a cultivator beam showing the relation of the crosshead and the shovel.

Figure 1:
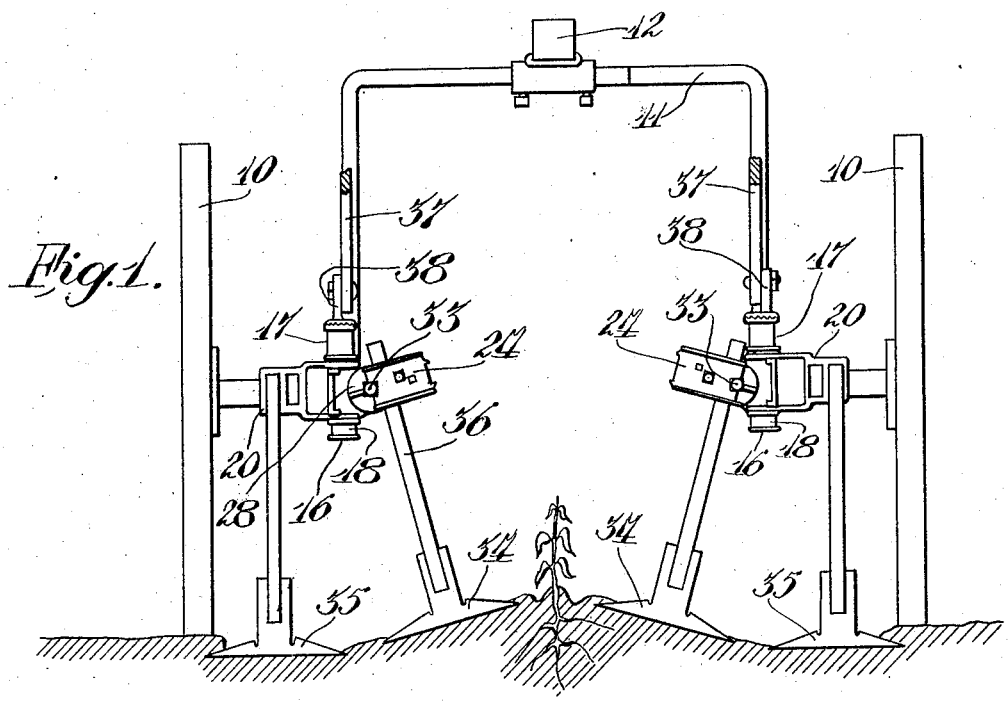
Figure 1 is a rear elevation of the cultivator showing the positions of the inner shovels after they have been angled and elevated relative to the outer shovels by a single movement of a part of the cross beam.
Figure 2:
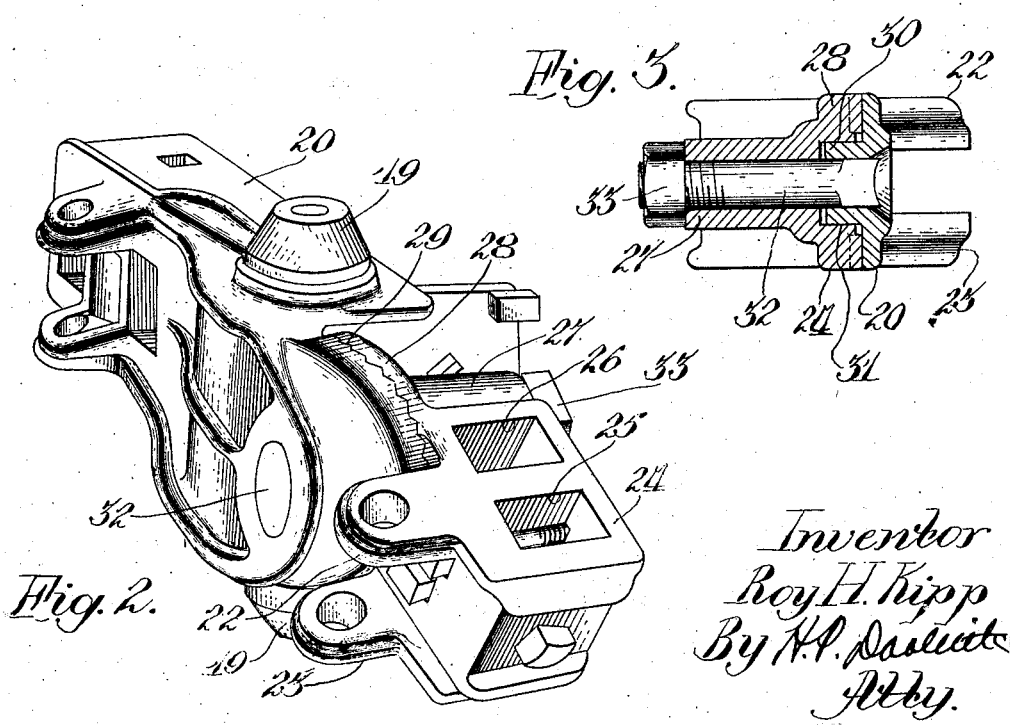
Figure 2 is a detail perspective view of the cultivator cross beam.
Figure 3:
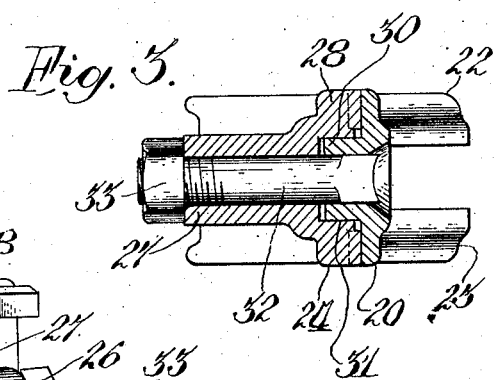
Figure 3 is a part sectional and part elevational view taken on the section line 3—3 of Figure 4 and looking in the direction of the arrows.

The illustrative cultivator comprises wheels 10 connected by an arch support 11 which carries a tongue 12. As shown in the drawings, the arch 11 is of a conventional construction having a horizontal portion near the wheel substantially parallel thereto (Figure 4), a second horizontal portion substantially at right angles to the first main portion, a vertical portion (Figure 1), and a top portion to which the tongue 12 is attached. The arch construction carries a sleeve 13 to which is secured a cultivator beam 14 swingable about a normal upright axis illustrated at 15.

The cultivator beam at its rearward end carries a bracket 16 having upper and lower forks 17 and 18, respectively. These forks provide mountings for corresponding bearing members 19 carried by the sectional crosshead comprising a main section 20 and an auxiliary section 24. The crosshead is thereby pivotally mounted upon the cultivator beam so that it may turn relative to the beam on a normally upright axis.

The crosshead is pivotally connected to the arch construction 11 by a link 21, which is shown pivoted at the forward end to the sleeve 13. At its rearward end the link 21 is pivotally received by either or both of ears 22 and 23 carried by the section 24 of the crosshead. The section 24 is formed with openings 25 and 26 for receiving cultivator standards in different positions. It is also formed with a sleeve construction 27 having at one end a face 28 of increased diameter formed with alternate grooves and ridges, as indicated at 29. The sleeve construction has an increased bore, as indicated at 30, for receiving a tubular extension 31 on the main section 20 of the crosshead. This construction secures the two sections of the crosshead with respect to each other and, when the two sections are pulled tightly together by the bolt and nut construction 32 and 33, a rigid crosshead is formed.

When the sections of the crosshead are angled, as indicated in Figure 1 of the drawings, the inner shovels 34 are elevated with respect to the outer shovels 35, and are angled by a single adjustment of the cross head without disturbing the clamp construction by which the cultivator standard 36 is held in the crosshead. This structure permits the cultivation of ridges next to plants at different levels without changing the normal operation of the shovels 35 in the middle of the rows.

The illustrative cultivator beam is provided with a handle 37 shown adjustably secured to the bracket 16 by means of a clamp 38 which permits the up and down, as well as lateral, angling of the handle with respect to the beam.

What is claimed as new is:

1. A cultivator comprising, in combination, a support, a cultivator beam pivotally secured to the support, on an upright axis, a link positioned alongside the cultivator beam and pivotally secured to the support on an upright axis, a main crosshead section carried by the cultivator beam and mounted thereon so as to turn upon a normally upright axis, an auxiliary crosshead section adjustably secured to the main section so as to be movable with respect thereto upon a horizontal axis substantially parallel to the cultivator beam, and a pivotal connection between the auxiliary crosshead section and the link.

2. A cultivator comprising, in combination, a support, a cultivator beam pivotally attached to the support, a main crosshead section pivotally secured to the rearward end of the cultivator beam so as to be swingable with respect thereto on an upright axis, an upright cultivator standard secured to said part, an auxiliary crosshead section movable bodily with respect to the main section upon an axis substantially parallel to the cultivator beam, a cultivator standard rigidly affixed to said auxiliary section and means for locking said section in any one of various positions to which it is turned relative to the main section.

In testimony whereof I affix my signature.

ROY H. KIPP.